US005437183A

United States Patent [19]

Janssen et al.

[11] Patent Number: 5,437,183

[45] Date of Patent: Aug. 1, 1995

[54] METHOD AND APPARATUS FOR MEASURING THE VOLUMETRIC EFFICIENCY OF SYSTEMS FOR RECOVERING HYDROCARBON VAPOR

[75] Inventors: Sylvain Janssen, Neuilly s/Seine; Jean-Pierre Campain, Clamart, both of France

[73] Assignee: Schlumberger Industries, Montrouge, France

[21] Appl. No.: 10,668

[22] Filed: Jan. 28, 1993

[30] Foreign Application Priority Data

Jan. 30, 1992 [FR] France ............................... 92 01024

[51] Int. Cl.[6] .............................................. G01F 15/18

[52] U.S. Cl. .......................................... 73/201; 73/3; 141/83

[58] Field of Search ..................... 73/149, 201, 198, 3, 73/168; 141/59, 83

[56] References Cited

U.S. PATENT DOCUMENTS

| | | | |
|---|---|---|---|
| 3,122,158 | 2/1964 | Grunsky | 73/201 |
| 4,018,252 | 4/1977 | Burtis et al. | 141/59 |
| 5,040,577 | 8/1991 | Pope | 141/59 |
| 5,156,199 | 10/1992 | Hartsell, Jr. et al. | 141/59 |
| 5,273,087 | 12/1993 | Koch et al. | 141/59 |
| 5,280,814 | 1/1994 | Stroh | 141/83 |

FOREIGN PATENT DOCUMENTS

| | | |
|---|---|---|
| 0425374A2 | 5/1991 | European Pat. Off. . |
| 0461770A1 | 12/1991 | European Pat. Off. . |

*Primary Examiner*—Hezron E. Williams
*Assistant Examiner*—Nashmiya N. Ashraf
*Attorney, Agent, or Firm*—Frishauf, Holtz, Goodman & Woodward

[57] ABSTRACT

A tubular device is slid over a delivery nozzle hose. A hose connects the tubular device to a gas meter. As fluid is expelled from the nozzle into the atmosphere, atmospheric air is sucked into the gas meter so that its volume can be measured for comparison with the volume of the expelled fluid.

5 Claims, 3 Drawing Sheets

METHOD AND APPARATUS FOR MEASURING THE VOLUMETRIC EFFICIENCY OF SYSTEMS FOR RECOVERING HYDROCARBON VAPOR

The present invention relates to a method and apparatus for measuring the volumetric efficiency of systems for recovering hydrocarbon vapor.

BACKGROUND OF THE INVENTION

When the tanks of motor vehicles are being filled with liquid fuel delivered from a storage tank, it is known that the fuel expels an equivalent volume of polluting gas to the surrounding atmosphere. Vapor recovery systems are known specifically for returning the polluting gas to the storage tank from which the delivered liquid was taken.

There exist various known methods for recovering these gases that comprise a mixture of air and gaseous hydrocarbons. However, all of them make use of special delivery nozzles. These nozzles contain an opening into which the gases are constrained to enter so as to be conveyed by a pressure difference into a channel that leads to the storage tank for the hydrocarbon liquid.

Whenever it is used, an ideal recovery system would ensure that equal volumes of liquid and of gas are transferred regardless of the flow rate, thereby providing 100% efficiency. In practice, this situation is difficult to achieve given imperfections in control, obstructions, possible leaks in the ducting, and also inevitable misadjustments.

The legislation in force in various countries requires efficiencies to be achieved within set limits, where efficiency is defined as the ratio of the volume of gas recovered divided by the volume of liquid delivered. Failure to recover gas leaves residual pollution, while excess suction gives rise to excess air in the storage tank which in turn leads to a danger of explosion.

In order to guarantee that fuel dispensers are operating within legal limits, an official inspection is required periodically, often once a year.

Until now, no apparatus or system has been available for checking the volume of vapor recovered under such circumstances when delivering fuel.

In other technical fields, it is known that volumes of gas or gaseous volumes can be checked by means of a gas meter (e.g. of the domestic type). It would therefore probably be possible to insert a gas meter in the duct for returning gas to the storage tank either upstream or downstream of the booster pump, thereby making it possible to compare volumes of vapor flow with volumes of delivered liquid fuel.

However, installing a gas meter in existing systems would require considerable work, with the equipment being taken temporarily out of service, thus leading to high costs. The return ducts are often buried or otherwise inaccessible.

Furthermore, there are practical problems that would make it difficult to install such a gas meter for measuring the recovered volume of fuel gases. For example, condensates may still be present in the duct and they could damage or even block the bellows of the meter. Also, it is practically impossible to calibrate a meter that is permanently installed in the duct periodically and easily. Furthermore, the efficiency calculation needs to take account of the pressure differences between the meter and atmospheric pressure.

To remedy the above-specified problems, an object of the invention is to provide a method and apparatus applicable to measuring the efficiency of known "assisted" recovery systems in which pumps and gas flow regulator devices are inserted in the gas return path, while avoiding any interference therewith.

SUMMARY OF THE INVENTION

To achieve this aim, the present invention provides apparatus for measuring the volumetric efficiency of hydrocarbon vapor recovery systems associated with a nozzle for delivering fuel, wherein the apparatus includes a gas meter, a tubular device for sliding onto the delivery nozzle, and a duct connecting the meter to the tubular device in an airtight manner.

There is a clear advantage: the apparatus of the invention is used easily by being placed directly on the nozzle of a known assisted recovery system. There is no need to modify existing systems. The apparatus, and more particularly its gas meter, are not exposed to fuel vapors. By using the apparatus of the invention as reference measurement means using atmospheric air, measurement results are obtained that are reproducible, independently of various different types of fuel. Apparatus of the invention can be used with any nozzle in a service station. Furthermore, the apparatus is compact and relatively easy to handle. It can be used by service station staff.

To ensure desired measurement accuracy, the apparatus can easily be calibrated by official organizations in the same way as gas meters for domestic or industrial use.

The invention also relates to a method of measuring the volumetric efficiency of hydrocarbon vapor recovery systems by using the apparatus of the invention (as described above).

BRIEF DESCRIPTION OF THE DRAWINGS

Embodiments of the invention are described by way of example with reference to the accompanying drawings, in which.

DETAILED DESCRIPTION

Figure 1:
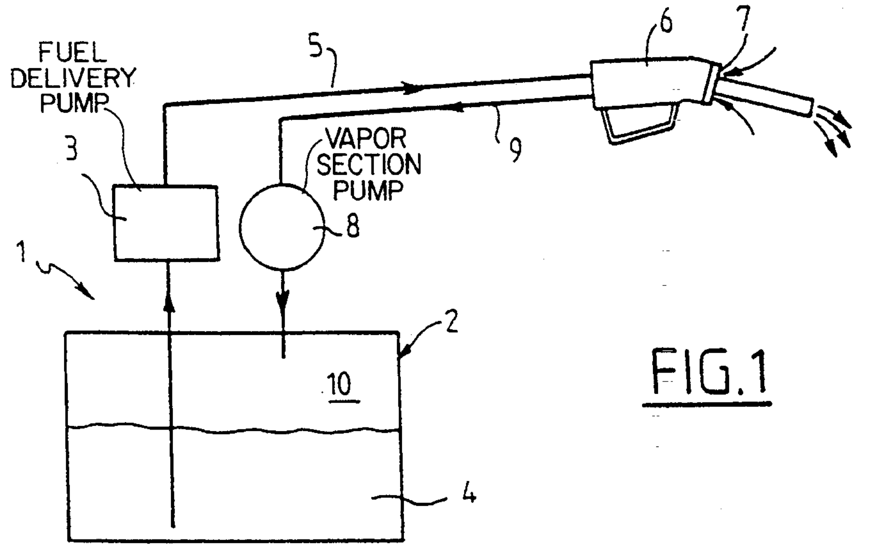
FIG. 1 is a diagram of a conventional assisted recovery system.

In an assisted recovery system of the kind well known in service stations and as shown diagrammatically in FIG. 1, there can be seen a quantity of liquid hydrocarbon 1 in a storage tank 2, and a fuel-delivery pump 3. The pump delivers the liquid 4 under pressure via a hose 5 to a delivery nozzle 6 which contains inlets 7 through which the volume of air containing fuel vapor is sucked in after being expelled from the vehicle tank by the incoming fuel. Another pump 8 and associated regulator device (not shown) serves to suck in the gas and cause it to travel along a channel 9 back to the storage tank 2 where it accumulates in the top portion 10 thereof, replacing the delivered volume of hydrocarbon, thereby avoiding air entering the storage tank via a safety vent (not shown) which communicates the storage tank with atmospheric pressure in a conventional manner.

What the inventors have observed is that it is, therefore, particularly easy to place a gas meter in front of the suction inlets of the nozzle and to perform testing using atmospheric air, with the system then sucking only pure air at atmospheric pressure through the meter.

Figure 2:
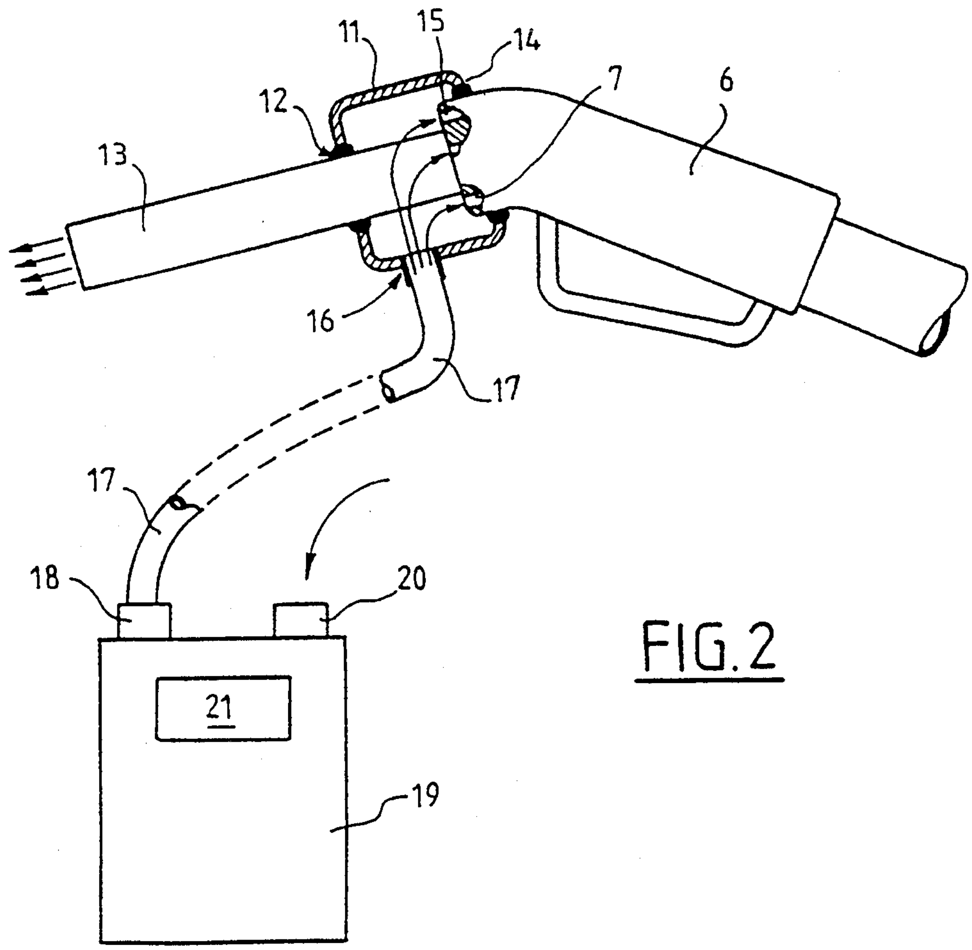
FIG. 2 is a diagram of a first embodiment of the apparatus of the invention, shown partially in section.

As shown in FIG. 2, the invention provides for a tubular device 11 to be placed over the vapor recovery inlets 7. The tubular device 11 is provided with an opening 12 through which the tubular end 13 of the nozzle 6 can be slid in sealed manner until an edge 14 on the opposite face of the tubular device 11 engages an edge 15 on the handle of the nozzle 6 likewise making an airtight seal therewith. It is recommended that the edge 14 be provided with at least one sealing gasket. It has been found that several sealing gaskets differing in elasticity and/or shape provide better positioning and sealing. A lateral tubular inlet 16 opens out into the tubular device 11 and serves to connect a tube, preferably a flexible hose 17, to be connected thereto and also to an outlet 18 of a gas meter 19.

Figure 3:
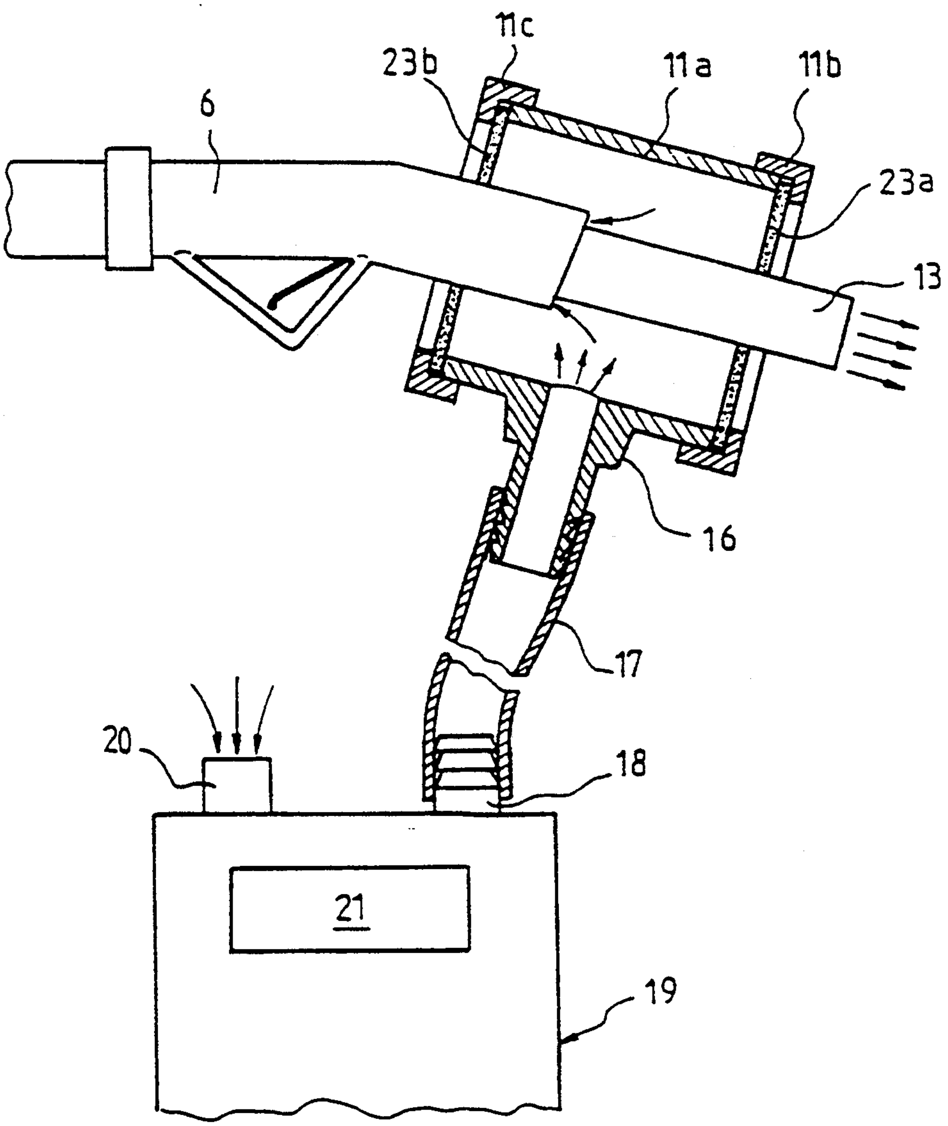
FIG. 3 is a diagram of a second embodiment.

FIG. 3 shows another embodiment of the invention. In principle, this embodiment is made of the same elements as the embodiment described with reference to FIG. 2 and it operates in similar manner. In FIG. 3, the tubular device is not formed as a single piece as shown in FIG. 2, but is constituted by a tubular portion 11*a* associated with two collars 11*b* and 11*c* each having a central opening.

The collars 11*b* and 11*c* are dismountably attached to the tubular portion 11*a*, preferably by screwing.

Between each collar 11*b* or 11*c* and the tubular portion 11*a*, there is a corresponding sealing washer 23*a* or 23*b* made of resilient material, and preferably of rubber.

The washers 23*a* and 23*b* are supported by the collars 11*b* and 11*c* and they also have central openings.

The inside diameters of the central openings in the washers 23*a* and 23*b* are slightly smaller than the outside diameters of the delivery nozzle 6. This guarantees that when the tubular device (11*a*, 11*b*, 11*c*, 23*a*, and 23*b*) is slid onto the nozzle 6, it is held securely in place on the nozzle 6, by means that are airtight.

All of the components (11*a*, 11*b*, 11*c*, 23*a*, and 23*b*) of the tubular device are well known standard articles, e.g. in plumbing.

In use, the above-described embodiments of the invention have the free end 13 of the nozzle 6 left free to enable a test to be performed by delivering a flow of fuel to a gauge or to any other receptacle (not shown). The air that is sucked in flows via an inlet 20 of the meter 19, through the gas meter 19, the hose 17, the tubular device 11, and thus into the vapor inlets 7 of the nozzle 6.

Efficiency is checked by comparing the volume of air measured by the gas meter 19 as read from indications given by a display device 21 on the gas meter 19, and the volume of liquid delivered, as determined, for example, by the measured volume of delivered fuel as indicated at the pump.

There is no need to make pressure corrections concerning the measured volume of air.

Figure 4:
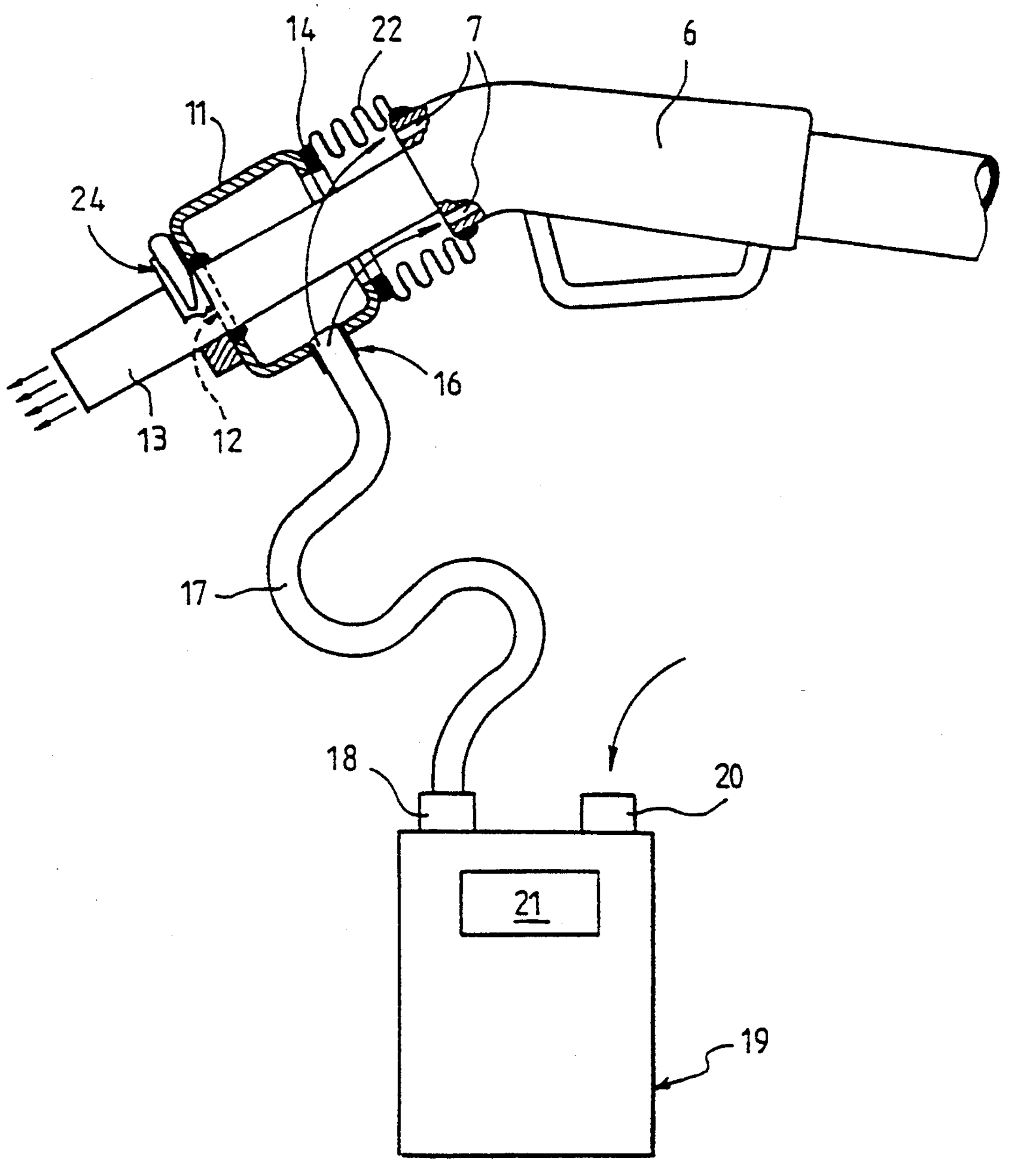
FIG. 4 is a diagram of a third embodiment.

The presence of a bellows on the assisted recovery nozzle (as is the case in the United States, for example) does not hinder the use of the apparatus of the invention in any way. In FIG. 4, the tubular device 11 has its opening 12 slid onto the cylindrical end 13 of the nozzle 6 in an airtight manner, while its sealing gasket 14 is simultaneously pressed against the edge of a bellows 22. The gas sucked in through the inlet 7 comes entirely from the tubular inlet 16 which is connected to the gas meter 19 for measurement purposes.

As shown in FIG. 4, it is advisable for the tubular device 11 of the invention to be used in association with a clamp 24 ensuring that the tubular device 11 is held in an airtight manner against the bellows 22 on the end 13 of the nozzle 6.

Such clamps 24 are well known and may include a locking mechanism having a lever, for example.

It can thus be seen that the invention provides a system for measuring the volume of vapor that is recovered while fuel is being delivered.

The apparatus of the invention is particularly suitable for use by official bodies when performing periodic inspections.

We claim:

1. Apparatus for measuring the volumetric efficiency of hydrocarbon vapor recovery systems associated with a nozzle for delivering liquid hydrocarbon, wherein the apparatus includes a gas meter having an input opening and an output opening, said input opening being open to the atmosphere, a tubular device for sliding onto the delivery nozzle to cover inlets in the nozzle from the atmosphere where said inlets are adapted to pass recovered hydrocarbon vapor to a storage tank during delivery of liquid hydrocarbon therefrom via the nozzle, and a duct connecting the output opening of said gas meter to the tubular device in an airtight manner to be in communication with said inlets such that the volumetric efficiency of a vapor recovery system is measured by drawing air through the gas meter.

2. Apparatus according to claim 1, wherein the tubular device comprises a tubular portion and two collars, together with two resilient washers which are slid over the nozzle in order to guarantee a fixed and airtight position for the tubular device.

3. Apparatus according to claim 1, wherein the tubular device has opposite ends which include openings through which the nozzle is slid and which respectively accommodate an end of the nozzle and an edge of a handle of the nozzle, said openings at said opposite ends of said tubular device being provided with respective sealing means shaped to match exterior outlines of the end of the nozzle and of the edge of said handle of the nozzle, thereby ensuring a fixed position for the tubular device.

4. Apparatus according to claim 1, wherein the tubular device is provided with sealed coupling means for holding the tubular device on the delivery nozzle.

5. A method for measuring the volumetric efficiency of a hydrocarbon vapor recovery system associated with a nozzle for delivering liquid hydrocarbon which has inlets adapted to pass recovered hydrocarbon vapor to a storage tank during delivery of liquid hydrocarbon therefrom via the nozzle, comprising the steps of:

covering the inlets with a tubular device so as to be airtight with the nozzle except at an opening provided therein, providing a gas meter with an input opening open to the atmosphere, and an output opening, connecting the output opening of the gas meter with the opening in the tubular device in an airtight manner so that said inlets can receive only air passing through said gas meter from the atmosphere, and activating the hydrocarbon vapor recovery system to suck air from the atmosphere through said gas meter thereby providing a measure of the volumetric efficiency of the vapor recovery system.

* * * * *